United States Patent [19]
Blüggel et al.

[11] 4,346,778
[45] Aug. 31, 1982

[54] AUTOMATIC SAFETY BELT SYSTEM

[75] Inventors: Erwin Blüggel, Kiel; Wolfgang Mainka, Wolfsburg, both of Fed. Rep. of Germany

[73] Assignee: Volkswagenwerk Aktiengesellschaft, Wolfsburg, Fed. Rep. of Germany

[21] Appl. No.: 128,279

[22] Filed: Mar. 7, 1980

[30] Foreign Application Priority Data

Apr. 11, 1979 [DE] Fed. Rep. of Germany ....... 2914643

[51] Int. Cl.³ ............................................. B60R 21/10
[52] U.S. Cl. .................... 180/268; 180/270; 250/559; 250/560; 280/801
[58] Field of Search ........... 180/268, 269, 270; 280/801; 242/107.4 R, 58.5, 57; 340/52 E; 307/10 SB; 200/61.58 B; 318/480; 250/559, 571, 560

[56] References Cited

U.S. PATENT DOCUMENTS

| | | | |
|---|---|---|---|
| 3,147,819 | 9/1964 | Keleher | 280/801 |
| 3,343,622 | 9/1967 | Maurer | 180/270 |
| 3,375,495 | 3/1968 | Burns | 180/268 |
| 3,381,268 | 4/1968 | Boblitz | 180/270 |
| 3,506,305 | 4/1970 | Eineman et al. | 242/107 |
| 3,566,132 | 2/1971 | Walker | 250/559 |
| 3,588,811 | 6/1971 | Prickett | 340/52 E |
| 3,709,604 | 1/1973 | Niesen | 242/57 |

Primary Examiner—Robert R. Song
Attorney, Agent, or Firm—Brumbaugh, Graves, Donohue & Raymond

[57] ABSTRACT

An automatic safety belt system includes a belt band wound on a spring-loaded roller and a signaling device for signaling when a sufficient length of the belt has been unwound to utilize it. The signaling device is a form of an electro-optical device.

6 Claims, 2 Drawing Figures

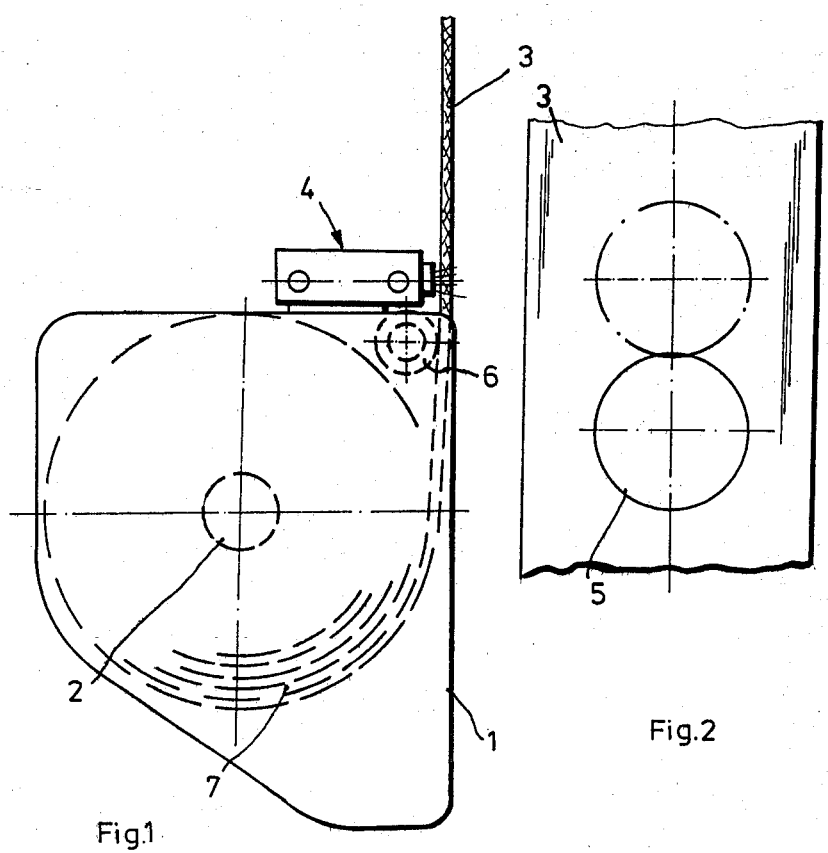

AUTOMATIC SAFETY BELT SYSTEM

BACKGROUND OF THE INVENTION

The present invention concerns an automatic safety belt system of the kind that includes a belt band wound on a spring-loaded roller and a device for signaling when a length of the belt sufficient for application about a user's body has been unwound.

A method is known (e.g. from German Letters of Disclosure No. 20 06 029 and U.S. Pat. No. 3,147,819) whereby an electric switch is arranged in a belt lock used to fasten the belt about a user's body, which switch prevents the engine from starting when the belt has not been locked (a so-called "interlock" system) or transmits a signal to the driver indicating that the safety belts have not been applied.

It is known that a signal indicating the proper application of the safety belt can be generated by means of a device arranged on or in the automatic-belt-retractor housing, which device determines how much of the belt band has been unwound (e.g. German Letters of Disclosure No. 22 17 443 and U.S. Pat. No. 3,506,305). In a known arrangement (German Letters of Disclosure No. 22 17 443), this device is designed as an electric switch. The belt band, on being pulled out of the housing, is pulled through the case of the electric switch and holds a movable switch contact arranged with the case in one position. The movable contact is allowed to move to a new position when the belt is unwound because of a perforation (hole, etc.) provided in the belt band. Thus, as soon as the belt band has been unwound a sufficient length from the reel, movement of the switch contact causes a corresponding modification of the switching state thereof. Perforations and the like arranged in the belt constitute problems in that the cross section of the belt band is weakened. Therefore, it may become necessary to increase the belt dimensions. Moreover, the functional efficiency of the safety belt over the long run may be put in doubt in that the mechanical contact slides along the belt band which, by necessity, results in a certain wear of the belt.

In another device, known from U.S. Pat. No. 3,506,305, the decrease in the diameter of the coiled belt when it is pulled off the reel is determined and is utilized as a signal indicating the proper application of the safety belt. Such a diameter examination can be relatively imprecise in that the correlation between the decrease in diameter and the unwound belt length is not very great.

SUMMARY OF THE INVENTION

It is the purpose of the present invention to improve an automatic safety belt system of the kind that includes a belt band wound on a spring-loaded roller and a signaling device that indicates when a length of belt sufficient for use has been unwound. In particular, it is an object of the invention to render the safety belt system in such a manner that the signal indicating that a sufficient length of the belt band has been unwound is obtained without wear and is very precise.

This purpose is attained in accordance with the invention by the utilization of an electro-optical device for signaling when the unwinding of the belt band has reached a certain extent. This electro-optical device offers a contact-free, and thereby wear-free, determination of the proper belt band length which is highly precise. Moreover, the solution of the problem is especially favorable with regard to the space required and it is economical in comparison with mechanical arrangements.

BRIEF DESCRIPTION OF THE DRAWINGS

The invention will be explained in detail by means of an example of an embodiment and with reference to the drawings in which:

FIG. 1 shows a side view of a portion of an automatic belt retractor system with an electro-optical device according to the present invention; and FIG. 2 shows a partial view of a safety belt band with reflecting fields for operating the electro-optical device.

DESCRIPTION OF AN EXEMPLARY EMBODIMENT

In the diagram appearing in FIG. 1, a housing 1 of an automatic safety belt retractor system is shown supporting a spring-loaded roller 2. The spring devices customarily present for spring-loading the roller so that a belt band 3 is automatically wound on it, as well as ratchet devices or the like for locking the belt, are not shown. The winding state of the belt band 3 represented in FIG. 1 is between an applied state, i.e. when the belt is unwound and is fastened about the body of the user, and a released state, i.e. when the belt is fully wound-up on roller 2 forming a coil 7 of the belt band. A broken line indicates the diameter of the fully wound belt band.

In order to determine if the belt band 3 has been unwound, i.e. more precisely, that a length of belt band sufficient to be utilized to restrain a user has been unwound, an electro-optical device 4 is provided. Towards such end, the device 4 is arranged in the vicinity of the belt path and cooperates with contrast markings 5 arranged on the belt band. A reflective or reflex device, i.e. a device with a light source and a light-sensitive detector accommodated in a common housing, is provided in the example of an embodiment. This type of device is activated by reflecting light from the source off the object being monitored, i.e. the markings 5, and into the detector. By preference an infrared source in the form of a light-emitting diode is used as the light source and the contrast markings 5 are rendered as reflecting fields arranged on the belt band 3 so that the light from the diode is reflected off of the markings on the belt and into the photodetector, which detector generates an electrical signal in response thereto. The markings 5 may be light-colored in comparison with the remainder of the belt, e.g. white colored fields. They may be applied in any desired manner, e.g. by gluing or printing them on the belt. However, as a matter of principle, the markings may be in any desired form. As regards their location, these reflecting markings are arranged in such a manner that they are located so as to be in the region of the electro-optical device 4 when the belt band is unwound sufficiently for proper application.

In the example, the electro-optical reflex device 4 is fixed on the automatic belt retractor housing 1 so that it is located in the vicinity of the exit of the belt band 3 from the housing. This offers not only structural advantages, but also the advantage that the device is positioned so that, right from the start, there is at least an approximately defined separation between the belt band and the reflex detector in all cases. As is customary in automatic safety belt retractor systems, a belt guide roller 6 is arranged in the interior of the housing in the vicinity of the belt exit. Such a guide roller acts as a deflection roller so that the exit angle of the belt is independent of the diameter of the coil 7. In those cases in which, for any reason whatever, the electro-optical device is not arranged directly on the housing, but is separated therefrom along the belt path, it is advisable to provide special guide means, e.g. guide rollers, near the device so that the distance between the belt and device does not vary greatly.

The electric signal emitted by the detector of the electro-optical device on passage of the contrast or reflecting markings is processed in an electric and/or electronic circuit arrangement. Depending on the requirements, the latter may be utilized to act on the starter or starting circuit in order to prevent the starting of the vehicle engine, or it may be used to transmit a corresponding warning signal to the driver when the safety belt is not put on, i.e. when the corresponding contrast or reflecting markings are not detected.

In a variation of the example of the embodiment shown, it is also possible as a matter of principle to employ other electro-optical device types in place of the reflex devices used, e.g. transmissive devices. However, this would imply the utilization of light-transmitting belt bands with opaque markings applied thereon. Moreover, in such a case, the spatial and structural problems would be increased.

We claim:

1. An automatic safety belt system with a belt band which can be wound on and off a spring-loaded roller mounted within a housing, one end of the belt band being attached to the roller, and a signaling means for signaling when a predetermined length of belt sufficient to allow it to be applied to a user is unwound, characterized in that the signaling means comprises an electro-optical device arranged in the vicinity of the belt band path and cooperating with contrast markings arranged on the belt band at positions related to the predetermined length, which positions are displaced from the end of the belt attached to the roller.

2. An automatic safety belt system as claimed in claim 1, characterized in that the device is of the reflex type and the contrast markings are reflecting marking fields applied to the belt band.

3. An automatic safety belt system as claimed in claim 2, characterized in that the reflex type device contains an infrared light source as well as an infrared light-sensitive detector, and the reflecting marking fields on the belt band reflect infrared light.

4. An automatic safety belt system as claimed in claims 2 or 3, characterized in that the reflex device is arranged in the vicinity of the exit of the belt band from the housing.

5. An automatic safety belt system as claimed in claim 4, characterized by at least one guide means conducting the belt band past the reflex device at an at least approximately defined distance.

6. An automatic safety belt system as claimed in claim 5, characterized in that the guide means is a guide roller arranged in the vicinity of the exit of the belt band from the housing.

* * * * *